(No Model.)
W. WATSON.
PLOW.
No. 445,027. Patented Jan. 20, 1891.
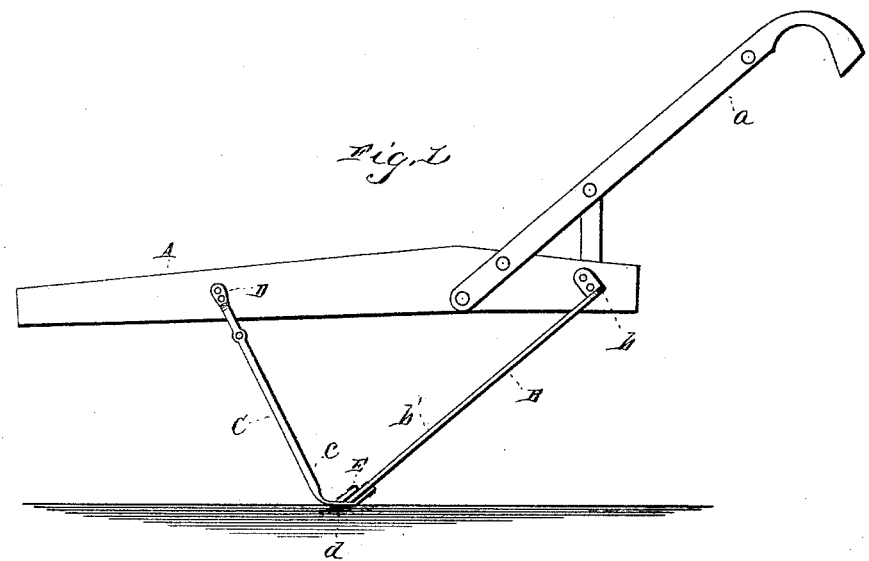
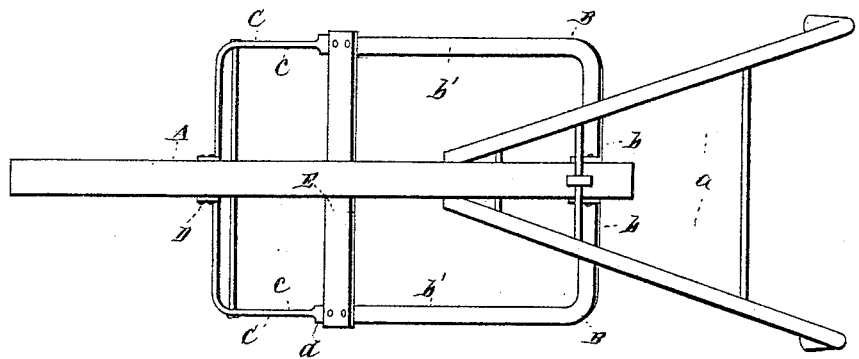
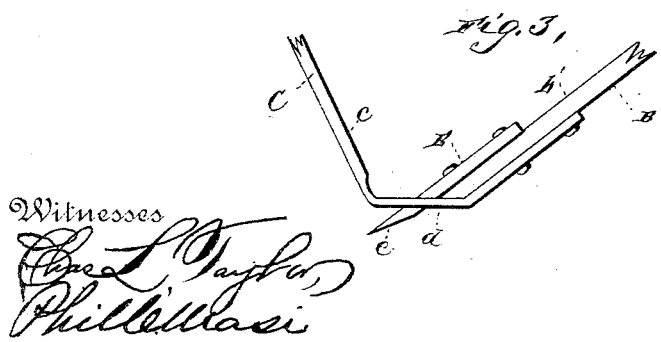
Witnesses
Chas L. Taylor
Phill Masi
Inventor
Wheeler Watson
by E. W. Anderson
his Attorney

UNITED STATES PATENT OFFICE.

WHEELER WATSON, OF STRONG'S STATION, MISSISSIPPI.

PLOW.

SPECIFICATION forming part of Letters Patent No. 445,027, dated January 20, 1891.

Application filed October 18, 1890. Serial No. 368,596. (No model.)

*To all whom it may concern:*

Be it known that I, WHEELER WATSON, a citizen of the United States, and a resident of Strong's Station, in the county of Monroe and State of Mississippi, have invented certain new and useful Improvements in Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation. Fig. 2 is a top plan view, and Fig. 3 is a detail view.

The invention has relation to plows or diggers for cutting the tap-roots of peanut-vines and for loosening the soil around the same; and it consists in the construction and combination of parts hereinafter described.

In the accompanying drawings, A represents a plow-beam of ordinary construction and provided with the handles $a\ a$. To the rear of these handles $a\ a$ a bar or drag rod B is secured to each side of the beam, said bars or rods projecting laterally therefrom to a point $b$, where they are bent downwardly and forwardly, forming the arms $b'$. Similar bars or rods C C are secured to the beam at D some distance in front of the handles. The downwardly-projecting arms $c$ of these rods are inclined rearwardly, and at their lower ends are provided with a rearwardly-extending arm $d$, adapted to bear on the surface of the ground, and connected at its end to the lower end of the arms $b'$ of the rods or bars B.

E represents the cutter or digger, which is secured to the lower ends of the arms $b'$ in a suitable manner and extends transversely beneath the beam. This cutter is inclined at the proper angle to do its work in the most effective manner, and is provided with the cutting-edge $e$.

In operation the bars or rods B B and C C straddle the rows or raised hills of the peanut-vines, the arms $d\ d$ resting one in each gutter at the side of the hills or rows. The cutter or digger E thus enters the ground and passes directly underneath the hills or rows, cutting the tap-root of each vine and loosening the ground preparatory to the easy removal of said vines and without moving the dirt or in any way injuring the peanuts.

It is evident that the arms $d\ d$, by bearing on the ground between the rows or hills, will prevent the cutter or digger from going beyond the required depth.

Having thus described my invention, what I claim as new, and desire to secure by Letters Patent, is—

1. The plow or cutter for the purpose herein described, said plow or cutter having the laterally and downwardly extending rods or drag-bars secured to each side of the plow-beam and carrying a transverse cutter or digger at their lower ends, substantially as described.

2. The plow or cutter having the forward and rearward laterally and downwardly extending rods or drag-bars secured to each side of the beam, said forward and rearward rods or bars being united at their lower ends and having arms adapted to bear on the ground, in combination with a transverse cutter or digger carried by said arms, substantially as described.

In testimony whereof I affix my signature in presence of two witnesses.

WHEELER WATSON.

Witnesses:
PHILIP C. MASI,
CHAS. L. TAYLOR.